Sept. 20, 1927.
E. TIMBS ET AL
1,642,979
UNITARY STRUCTURE FOR CROWN SHEAVES
Filed June 23, 1924
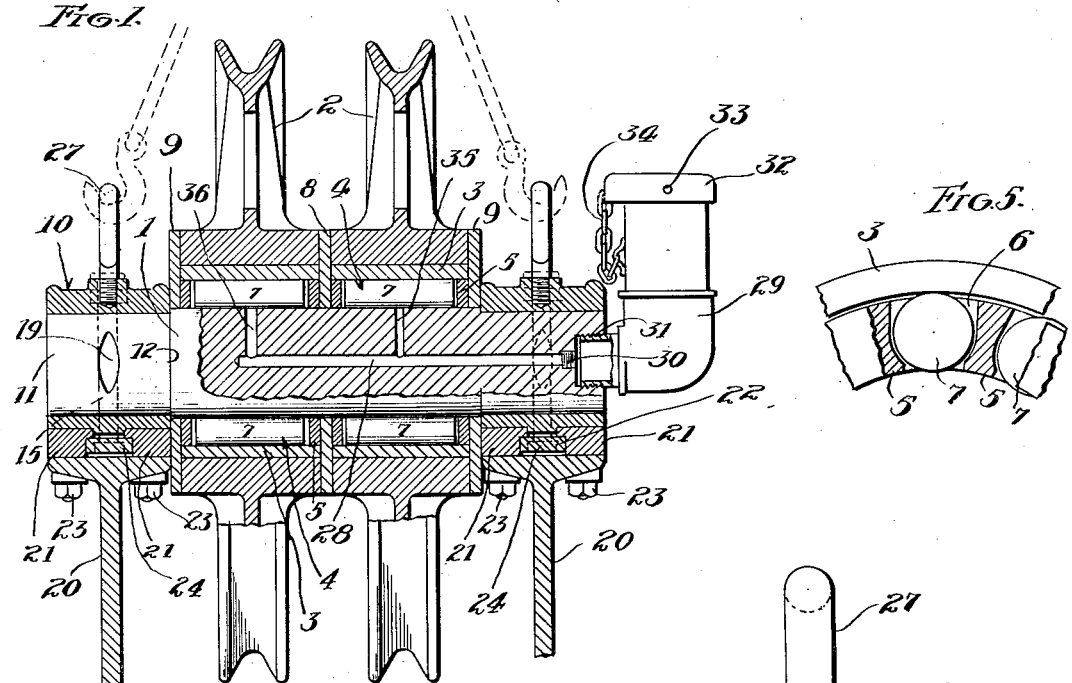
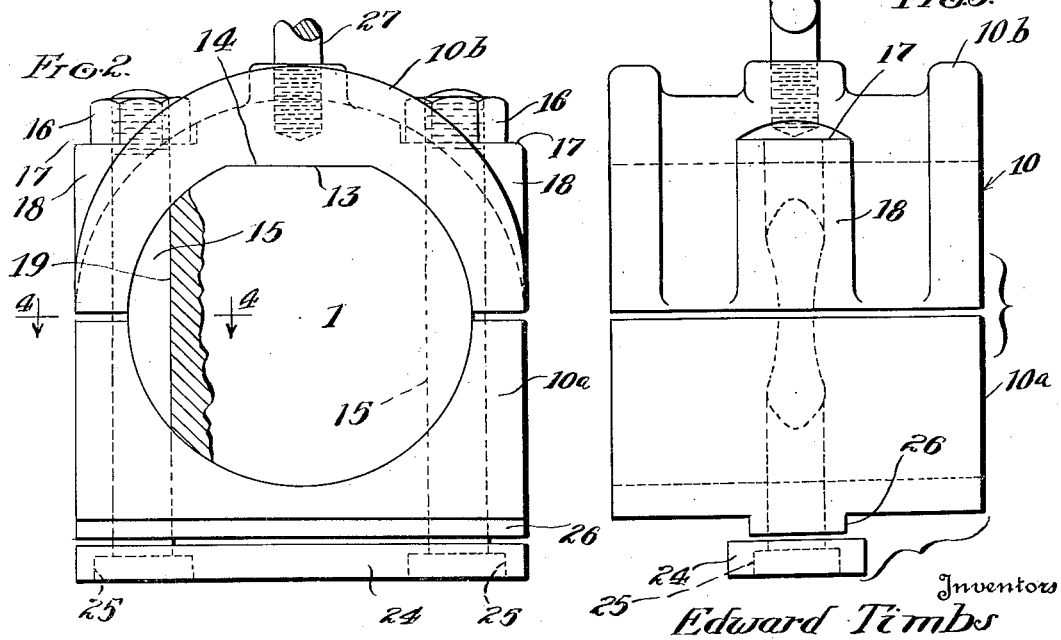
Inventors
Edward Timbs
Lewis E. Zerbe
By Lyon+Lyon
Attorneys Patented Sept. 20, 1927.

1,642,979

UNITED STATES PATENT OFFICE.

EDWARD TIMBS, OF LOS ANGELES, AND LEWIS E. ZERBE, OF MONETA, CALIFORNIA, ASSIGNORS TO UNION TOOL COMPANY, OF TORRANCE, CALIFORNIA, A CORPORATION OF CALIFORNIA.

UNITARY STRUCTURE FOR CROWN SHEAVES.

Application filed June 23, 1924. Serial No. 721,847.

This invention relates to the construction of crown-block sheaves or casing sheaves such as are supported on the crown-block of an oil derrick, but the invention is applicable to any structure including a shaft with boxes and bearings at its ends, which must be shipped, or hoisted to an elevation. Such a structure usually includes boxes at the ends of the shaft, which are provided with means for holding them on the beam, and frequently the shaft is provided with an internal duct for supplying lubricant to the bearings of the sheave, or sheaves, mounted on the shaft. The end of the shaft is usually provided with a grease cup which is screwed into place and which extends upwardly from the shaft. The weight of this grease cup tends to rotate the shaft, and would spill the grease; in addition to which the rotation of the shaft would throw the lateral ducts to the sheave bearings out of their proper position. It greatly facilitates the assembly of these parts if they can be assembled on the ground and then elevated with a hoisting tackle as a unitary structure. However, as ordinarily constructed it would be possible for the shaft to become dislodged from the end boxes. The general object of this invention is to produce a unitary structure for these parts which can be readily assembled on the ground and hoisted by means of a tackle, the parts being so related to each other that the shaft will maintain the grease cup in its proper position, and so as to prevent dislodgement of the end boxes which are destined to support the shaft on the beams after the structure has been lifted into position; also to provide a construction which will insure ample lubrication of the sheave bearings.

Further objects of the invention will appear hereinafter.

The invention consists in the novel parts and combinations of parts to be described hereinafter, all of which contribute to produce an efficient unitary structure for crown-sheaves.

A preferred embodiment of the invention is described in the following specification, while the broad scope of the invention is pointed out in the appended claims.

In the drawings:

Fig. 1 is a vertical section through the upper portion of two supporting beams which are represented as supporting my unitary structure which is also shown in cross-section but with the shaft partly in elevation.

Fig. 2 is an end elevation of the unitary structure but showing the left end of the structure as viewed in Fig. 1, the grease cup and the sheaves being omitted and the lifting eye-bolt broken away.

Fig. 3 is a side elevation of one of the boxes illustrating details of its construction, the bolts which attach the parts of the bearing together being omitted.

Fig. 4 is a fragmentary view and may be considered as a horizontal section taken about on the line 4—4 of Fig. 2.

Fig. 5 is a detail showing a short portion of a roller cage and illustrating the way in which it carries the rollers for the bearings of the sheaves.

In practicing our invention we provide a shaft 1, the body of which may rotatably support one or more sheaves 2. In the present instance these sheaves are provided with bushings 3, mounted on roller bearings 4. Each roller bearing may comprise a cage 5 with pockets 6 on its outer face to receive the rollers 7. The inner sides of the rollers roll on the side of the shaft and the outer sides engage the bushing 3.

Between the sheaves a washer 8 is provided and similar washers 9 are provided at the ends of the shaft, the latter washers 9 being held in place by two boxes 10 which are separate and independent of each other and attached respectively to the ends of the shaft. At the boxes the shaft is preferably formed into necks 11 of somewhat reduced diameter so that a shoulder 12 is formed at each end of the shaft against which the inner ends of the boxes 10 seat.

These boxes 10 and the shaft are provided with interlocking means so that the boxes will prevent rotation of the shaft, and these parts are also constructed so as to prevent any parts of the boxes from becoming dislodged from the necks, that is to say, prevent the boxes from sliding off of the necks. In order to accomplish this each box is preferably composed of two sections, namely, a body section $10^a$ and a cap section $10^b$. In order to prevent the shaft from rotating in the boxes we prefer to provide the upper side of each neck with a substantially flat face 13, and the cap section 10^b is provided with a cooperating substantially flat face 14 which seats on the face 13. In order to secure the sections of the box together, and at the same time, to prevent the boxes from becoming dislodged from the necks, we provide each box with a pair bolts 15, one bolt being disposed on each side of the shaft. These bolts pass through openings in the box sections and their upper ends are provided with nuts 16 which seat on the upper faces 17 of bosses 18 formed on the sides of the cap section.

Opposite each bolt the shaft is provided with a transverse groove 19 which extends in a vertical direction so as to receive the bolt (see Figs. 2 and 4). When the bolts are in place it will be evident that they cooperate with these grooves 19 to prevent the boxes from becoming dislodged from the necks.

Any suitable means may be provided for securing the boxes to their supporting beams 20. In the present instance the upper face of each beam is provided with two strips 21 and each of these strips has a rabbet groove 22 cut on its inner face so that when the strips are secured in place by bolts 23 the effect of a T slot is produced. This T slot receives an anchor bar 24 with sockets 25 on its underside to receive the heads of the bolts 15. In addition to this the underside of the box is provided with a transverse tongue 26 which is received in the upper part of the T slot. This tongue cooperates with the T slot to guide the box on the beam when it is necessary to adjust the same along the beam.

Each box 10 is provided with means such as an eye-bolt 27 to facilitate attachment of a hoisting tackle, it being understood that the tackle would have two hooks to be attached to the eye-bolts, and forming part of a sling as indicated in dotted lines in Fig. 1.

By reason of the location of these sheaves at the top of a derrick they are relatively inaccessible and it is necessary to provide means for supplying lubricant to the bearings for a considerable time without replenishing. For this reason we provide the shaft 1 with a longitudinal duct 28 for the lubricant, said duct extending in from one end of the shaft into which is screwed a threaded nipple of a grease cup 29. The duct 28 is provided with a thread 30 at its outer end which enables a grease gun to be attached in case a grease cup 29 is not employed.

The threads of the threaded nipple 31 are cut so that the grease cup will be tight in the thread when it extends upwardly from the shaft (see Fig. 1). The grease cup may be provided with a cover 32 with a removable pin 33 for securing it in place and for safety should be attached to the grease cup by a small chain 34.

In order to conduct the lubricant to the bearings of the sheaves we provide the shaft with two lateral extensions 35 and 36 and we construct the duct 28 and these two ducts 35 and 36 in such a way as to insure a sufficient supply of grease to both the bearings. In the present instance we accomplish this by making the duct 36, which is remote from the grease cup, of considerably larger area than the duct 35. All of these ducts may be formed in the shaft by drilling the shaft with drills of any desired diameter.

With a structure embodying this invention it will be evident that when the hooks of the sling are attached to the eye-bolts 27, the boxes will support the shaft against rotation and with the grease cup 29 maintained in its upright position. Furthermore, the bolts 15 with their cooperating slots or grooves 19 will effectively prevent the boxes from slipping off the ends of the shaft in case the structure should be roughly handled in slinging it up into position.

It is understood that the embodiment of the invention described herein is only one of the many embodiments this invention may take, and we do not wish to be limited in the practice of our invention, nor in our claims, to the particular embodiment set forth.

What we claim is:

1. In a unitary structure for crown-sheaves and the like, the combination of a shaft, a sheave carried thereby, a box at each end of the shaft for supporting the same, each box comprising two separate sections, a pair of bolts corresponding to each box disposed on opposite sides of the shaft and connecting the sections of the box together, said shaft having transverse grooves receiving their corresponding bolts and operating to lock the boxes against dislodgment from the ends of the shaft.

2. In a unitary structure for crown-sheaves and the like, the combination of a shaft having a neck at each end, a sheave carried on the shaft between the necks, a box received on each neck for supporting the shaft, each box comprising two box sections, one of said sections having a substantially flat face, and the corresponding neck having a substantially flat face, each box having a pair of bolts disposed on opposite sides of the neck and operating to clamp the sections of the box together with the flat faces engaging each other and operating to secure the boxes on the necks.

3. In a unitary structure for crown-sheaves and the like, the combination of a shaft having a neck at each end with a substantially flat face on its upper side, a sheave carried on the shaft between the necks, a box at each end of the shaft having a body-section with means on its underside to facilitate its attachment to a supporting beam, and having a cap-section with a substantially flat face for engaging the flat face of the neck, each box having a pair of bolts passing through the box sections for securing the same together and for clamping the cap-section with its flat face engaging the flat face of the corresponding neck, each neck having transverse grooves receiving the bolts respectively and cooperating with the bolts to lock the boxes against dislodgment from the necks.

4. In a unitary structure for crown-sheaves and the like, the combination of a shaft having a neck at each end, a sheave carried on the shaft between the necks, a box at each end of the shaft for supporting the same, each box having means on its upper side for attaching a tackle for hoisting the structure to an elevation, a grease-cup attached to the end of the shaft and extending upwardly therefrom, each of said boxes comprising two sections, a pair of bolts corresponding to each box for securing the sections together, the said necks having means for engaging the bolts, operating to prevent rotation of the shaft in the boxes.

5. In a unitary structure for crown-sheaves and the like, the combination of a shaft, a grease-cup attached to the end of the shaft and extending upwardly therefrom, a pair of sheaves rotatably mounted on the shaft, said shaft having a longitudinal duct communicating with the grease-cup and having a lateral extension to supply grease to the sheave bearing which is adjacent to the grease-cup, said duct also having a lateral extension remote from the grease-cup to supply grease to the other sheave bearing, the last named lateral extension being of larger diameter than the first named lateral extension, said shaft having a neck at each end, a box receiving each neck and having eyes secured to its upper side for attaching the structure to a hoisting tackle operating to maintain the grease-cup in an upright position when the structure is being lifted by the eyes, and means associated with the boxes and neck, for preventing rotation of the shaft in the boxes.

Signed at Torrance, Calif., this 14th day of June, 1924.

EDWARD TIMBS.
LEWIS E. ZERBE.